(12) United States Patent
Sapienza et al.

(10) Patent No.: US 8,878,049 B2
(45) Date of Patent: Nov. 4, 2014

(54) DURABLE, LIGHTWEIGHT, AND EFFICIENT SOLAR CONCENTRATOR

(75) Inventors: Richard Sabino Sapienza, East Moriches, NY (US); Robert Bagno, Northport, NY (US)

(73) Assignee: Persistent Energy, LLP, East Moriches, NY (US)

( * ) Notice: Subject to any disclaimer, the term of this patent is extended or adjusted under 35 U.S.C. 154(b) by 1047 days.

(21) Appl. No.: 12/456,656

(22) Filed: Jun. 19, 2009

(65) Prior Publication Data

US 2010/0170560 A1 Jul. 8, 2010

Related U.S. Application Data

(60) Provisional application No. 61/132,490, filed on Jun. 19, 2008.

(51) Int. Cl.
*H01L 31/042* (2014.01)
*H02N 6/00* (2006.01)
*F24J 2/52* (2006.01)
*F24J 2/14* (2006.01)
*F24J 2/16* (2006.01)
*F24J 2/10* (2006.01)
*F24J 2/46* (2006.01)

(52) U.S. Cl.
CPC .. *F24J 2/16* (2013.01); *Y02E 10/45* (2013.01); *Y02E 10/52* (2013.01); *F24J 2/52* (2013.01); *F24J 2/14* (2013.01); *Y02E 10/47* (2013.01); *F24J 2/1057* (2013.01); *F24J 2002/467* (2013.01)
USPC ....................................... 136/246

(58) Field of Classification Search
USPC ........... 136/246, 247, 248; 126/689, 690, 696
See application file for complete search history.

(56) References Cited

U.S. PATENT DOCUMENTS

| | | |
|---|---|---|
| 4,026,272 A | 5/1977 | Bottum |
| 4,091,793 A | 5/1978 | Hermann et al. |
| RE29,737 E | 8/1978 | Bottum |
| 4,131,109 A | 12/1978 | Coxon et al. |
| 4,149,525 A | 4/1979 | Prado |
| 4,150,657 A | 4/1979 | Bowen |
| 4,153,042 A | 5/1979 | Tragert |

(Continued)

OTHER PUBLICATIONS

Author Unknown, Reflection of Light dated Mar. 5, 2003.*

(Continued)

*Primary Examiner* — Eli Mekhlin
(74) *Attorney, Agent, or Firm* — Locke Lord LLP; Alan B. Clement; Peter J. Fallon

(57) ABSTRACT

A solar concentrator, which is modular, durable, lightweight, and cost-efficient is described. The solar concentrator is constructed from a plurality of interconnected reflector panels that are secured to a contoured support frame assembly by means of an adjustable fastening mechanism. The reflector panels are preferably fabricated from a low-cost composite material and have an optically flat front surface. A specularly reflective front surface is formed on the reflector panel by deposition of a plurality of thin films which are highly reflective. Individual reflector panels can be interconnected and arranged into a two-dimensional grid having a predetermined degree of curvature by means of the contoured support frame assembly. Electromagnetic radiation incident upon the reflector panel arrangement is reflected to and concentrated upon a collector plate or receiving surface or receiver where it may be converted into a usable form of energy.

33 Claims, 11 Drawing Sheets

(56) References Cited

U.S. PATENT DOCUMENTS

| | | | |
|---|---|---|---|
| 4,156,419 A | 5/1979 | Lewis, Sr. | |
| 4,166,446 A | 9/1979 | Youngs | |
| 4,178,909 A | 12/1979 | Goolsby et al. | |
| 4,212,292 A | 7/1980 | Reinert | |
| 4,213,449 A | 7/1980 | Roth et al. | |
| 4,237,869 A | 12/1980 | Rooney | |
| 4,243,023 A | 1/1981 | Rom et al. | |
| 4,244,356 A | 1/1981 | Barrett | |
| 4,249,513 A | 2/1981 | Dostrovsky | |
| 4,257,396 A | 3/1981 | Reinert | |
| 4,258,699 A | 3/1981 | Masel et al. | |
| 4,259,946 A | 4/1981 | Roehm | |
| 4,275,710 A | 6/1981 | Stevenson | |
| 4,286,580 A | 9/1981 | Sitnam | |
| 4,287,880 A | 9/1981 | Geppert | |
| 4,289,119 A | 9/1981 | Meyer, Sr. | |
| 4,290,418 A | 9/1981 | Uroshevich | |
| 4,294,232 A | 10/1981 | Boy-Marcotte et al. | |
| 4,306,543 A | 12/1981 | Doevenspeck et al. | |
| 4,314,548 A | 2/1982 | Hanson | |
| 4,316,452 A | 2/1982 | Levine | |
| 4,318,394 A | 3/1982 | Alexander | |
| 4,327,707 A | 5/1982 | Wilhelm | |
| 4,335,708 A | 6/1982 | Hölter et al. | |
| 4,339,484 A | 7/1982 | Harding | |
| 4,340,035 A | 7/1982 | Begun | |
| 4,344,415 A | 8/1982 | Bottum | |
| 4,407,270 A | 10/1983 | Riedel | |
| 4,413,618 A | 11/1983 | Pitts et al. | |
| 4,416,265 A | 11/1983 | Wallace | |
| 4,469,088 A | 9/1984 | Anzai et al. | |
| 4,471,764 A | 9/1984 | Calvert et al. | |
| 4,480,634 A | 11/1984 | Kellner | |
| 4,538,592 A | 9/1985 | Sundquist | |
| 4,566,433 A | 1/1986 | Amundsen | |
| 4,602,853 A * | 7/1986 | Barr | 359/852 |
| 4,656,996 A * | 4/1987 | Aharon | 126/600 |
| 4,846,151 A | 7/1989 | Simko, Jr. | |
| 4,999,059 A * | 3/1991 | Bagno | 136/248 |
| 5,022,929 A | 6/1991 | Gallois-Montbrun | |
| 5,058,564 A | 10/1991 | Delacretaz et al. | |
| 5,275,150 A | 1/1994 | Lai | |
| 5,660,462 A * | 8/1997 | Bockley et al. | 362/256 |
| 5,794,611 A | 8/1998 | Bottum, Jr. et al. | |
| 5,894,837 A | 4/1999 | Groesswang | |
| 6,036,323 A * | 3/2000 | Meijer | 359/851 |
| 6,047,697 A | 4/2000 | Best | |
| 6,558,010 B2 * | 5/2003 | Takahashi | 359/552 |
| 6,598,601 B2 | 7/2003 | Schütz | |
| 7,109,461 B2 * | 9/2006 | Lasich | 250/203.4 |
| 7,312,916 B2 * | 12/2007 | Pullen et al. | 359/296 |

OTHER PUBLICATIONS

International Search Report and Written Opinion of the International Searching Authority issued Aug. 10, 2009 for corresponding International Application No. PCT/US09/03667.

Chris Morrison, "A Path to Cheaper Solar Energy: Big Mirrors by Alcoa," Mar. 19, 2010 (2 pages).

* cited by examiner

DURABLE, LIGHTWEIGHT, AND EFFICIENT SOLAR CONCENTRATOR

CROSS-REFERENCE TO RELATED APPLICATIONS

This application claims priority to U.S. Provisional Patent Application No. 61/132,490 which was filed on Jun. 19, 2008 and is incorporated by reference as if fully set forth herein.

BACKGROUND OF THE INVENTION

I. Field of the Invention

This invention relates generally to a solar concentrator. In particular, the present invention relates to simple, lightweight, and inexpensive reflector panels comprising reflective surfaces of excellent optical quality. The invention also relates to an assembly comprising a plurality of reflector panels arranged on and secured to a contoured support frame assembly. The invention also relates to the use of this assembly to reflect and concentrate incident radiation onto a reference surface.

II. Background of the Related Art

A solar concentrator operates by intercepting incoming solar radiation and redirecting it to a concentrated region where it is changed into a useable form of energy that can be applied to meet a specific demand. Energy harvested in this manner is known as concentrated solar power (CSP) and it is currently more efficient than photovoltaic cells at converting solar radiation into electricity. Another advantage of CSP is that it can also supply process heat and power while tracking the sun. The amount of energy generated by a solar concentrator depends on its efficiency which, in turn, is determined by how it is constructed, its configuration, and the choice of materials used. The key and, frequently, one of the most expensive components in a solar concentrator is the reflective surface which is also referred to as a solar mirror. There are three generic types of solar mirrors: heliostats, parabolic troughs, and solar dishes. These are known as central receiver type, line focus type, and point focus type solar mirrors, respectively.

Heliostats are substantially flat reflectors which concentrate sunlight onto raised focal point receivers. An example of a heliostat comprising reflector elements and carriers which support the reflector elements above a ground plane is disclosed in U.S. Patent Publ. No. 2004/0074490 to Mills, et al. which is incorporated by reference as if fully set forth herein. Heliostats are disadvantageous in that they have stringent mirror contour requirements as well as the added expense of tall towers which are needed to support the remote receivers. Parabolic troughs are one of the most commonly used solar reflectors. They are simple-curve parabolic reflectors which concentrate sunlight onto long receiver pipes spanning the full length of the reflectors. The disadvantages of troughs include a low maximum solar concentration, high receiver heat losses, and high receiver costs. Since both heliostats and troughs do not face the sun directly, both suffer from performance losses known as cosine losses. Solar dishes are compound-curve paraboloidal reflectors which concentrate sunlight onto small receivers supported near the centers of dish apertures. Solar dishes generally achieve the highest solar concentrations and the best efficiency since they directly face the sun. However, solar dishes are the most expensive solar reflectors, requiring fabrication of costly compound and complex reflector curves and the use of expensive mirror substrates. Heliostats and solar dishes also require dual axis optical tracking capabilities.

Although the different types of solar mirrors discussed above may be advantageous for specific purposes, their complexity, stringent design requirements, and comparatively high cost are barriers to their widespread implementation as solar concentrators. The additional cost considerations arise primarily from the complexity associated with their fabrication and use. Some further examples include the need for molding substrates to control mirror curve contours, use of air pressure to deflect reflective membranes, fabrication of structures with a contiguous mirror support for mirror curve shaping, and the implementation of systems to avoid thermal stresses in mirrors due to use of dissimilar structural materials. The complexity of conventional solar mirrors is furthered by the need for motorized solar tracking drives, tracking rails, and pivot bearings.

A variety of approaches have been followed in attempting to simplify some of the additional complexities identified above. An example is U.S. Pat. No. 7,192,146 to Gross, et al. which discloses a ground-based tracking array in which the orientation of all optical elements in the array can be adjusted by a single motor. Another example is provided by U.S. Pat. No. 7,156,088 to Gregg Luconi which discloses a simplified support structure for solar concentrators which may be mounted in areas where penetration of the mounting surface for anchoring purposes is not permitted. Examples of devices which enable tracking of the sun's motion are described in U.S. Pat. No. 6,960,717 to Stuart, et al.; U.S. Pat. No. 6,552,257 to Hart, et al.; and U.S. Pat. No. 6,042,240 to Louis Strieber. Each of the aforementioned patents are incorporated by reference as if fully set forth herein.

Although the above applications each address a number of design issues, the reflective surfaces used in the prior art still suffer from a number of problems. Generally, solar mirrors are formed from either a polished metal sheet or a glass plate which is backed by a reflective film and supported by a metal substrate. An example of a mirror formed from glass having a metallic silver coating deposited thereon is provided in U.S. Pat. No. 4,737,188 which is incorporated by reference as if fully set forth herein. These type of reflective surfaces are generally extremely heavy, are difficult to fabricate to precisely tailored dimensions and, in the case of glass, are susceptible to fracture. An additional issue is that the materials from which the mirror itself is fabricated are generally expensive and are susceptible to corrosion under ambient conditions. In view of the above and other considerations there is therefore a continuing need to develop a simplified and cost-efficient solar concentrator from high-quality reflective elements which are durable, lightweight, and of low cost.

SUMMARY OF THE INVENTION

In view of the above-described problems, needs, and goals, it is an objective of the present invention to provide a solar concentrator of relatively simple construction which is inexpensive to manufacture and deploy. In one embodiment this is accomplished by assembling a plurality of reflector panels, each of which has a reflective front surface, into a contoured two-dimensional arrangement capable of directing incident solar radiation to a reference region. The reflector panels are simple, lightweight, and robust, yet of excellent optical quality and are inexpensive to manufacture and deploy. According to one specific embodiment of the invention, the reflector panels have a front surface which is optically flat, being formed from a lightweight yet rigid material having a specularly reflective coating formed thereon.

In another specific embodiment of the invention, the sides defining the front surface of the reflector panels form the shape of a square. However, it is within the scope of the present invention to have reflector panels with any shape or combination of shapes which facilitate efficient packing within a two-dimensional plane as is well-known in the art. Examples include triangular, rectangular, hexagonal, or octagonal shapes. The reflector panels preferably have a front surface which is optically flat and provides for specular reflection of incident radiation. In one embodiment, each reflector panel comprises male and female connectors formed at each side of the reflector panel at positions along the panel centerlines. The connector type preferably alternates between male and female around the perimeter of each individual reflector panel. The male and female connectors are capable of interlocking via a snap-together feature. A taper is incorporated into the interlock such that when a plurality of reflector panels are arranged into a two-dimensional array, the entire grid of reflector panels can be contoured to the desired bend angle in both horizontal and vertical directions. The bend angle is such that the surface contour formed by the arrayed reflector panels corresponds with a portion of the surface of a parabola or sphere.

In one embodiment the reflector panels are formed from a plastic or composite material which yields a finished product of excellent hardness, rigidity, and durability and which is compatible with the process used to impart reflectivity to the front surface. According to another embodiment of the invention, the reflector panels are formed from acronitrile-butadiene-styrene (ABS) resins. The reflector panels are manufactured by injection molding into a single-cavity mold. In yet another embodiment the reflector panels may be formed from a lightweight metal such as aluminum, titanium, or related metal alloys.

In an alternative embodiment the reflector panel is formed from a granular plastic material comprising a plastic material and an inorganic additive. The plastic may be selected from polycarbonate, olefin resins, ABS resin, recycled synthetic resin material, and styrol resin. The additive may comprise oxides, hydroxides, carbonates, sulfates, silicates, nitrides, carbons, and potassium titanate. The amount of potassium titanate added is preferably in the range of 20 to 60 percent by weight. The oxides may consist of silica, diatomaceous earth, alumina, magnesium oxide, titanium oxide, zinc oxide, and antimony oxide. The amount of silica, diatomaceous earth, alumina, or magnesium oxide used is preferably in the range of 20 to 60 percent by weight. The amount of titanium oxide, zinc oxide, or antimony oxide is preferably in the range of 25 to 70 percent by weight. The hydroxide may consist of magnesium hydroxide, aluminum hydroxide, or basic magnesium carbonate. The amount of the hydroxide is preferably in the range of 20 to 60 percent by weight. The carbonate may consist of calcium carbonate, magnesium carbonate, or barium carbonate. The amount of calcium carbonate or magnesium carbonate is preferably in the range of 20 to 60 percent by weight whereas the amount of barium carbonate is preferably in the range of 25 to 70 percent by weight. The sulfate may consist of calcium sulfate, calcium sulfite, or barium sulfate. The amount of calcium sulfate or calcium sulfite is preferably in the range of 20 to 60 percent by weight whereas the amount of barium sulfate is preferably in the range of 25 to 70 percent by weight. The silicate may consist of calcium silicate, talc, kaolin clay, mica, zeolite, attapulgite, bentonite, sericite, aluminum silicate, feldspar powder, magnesium silicate or apatite. The amount of silicate is preferably in the range of 20 to 60 percent by weight. The nitride is preferably silicon nitride and the carbon may be either carbon black or graphite. The nitride concentration is preferably in the range of 20 to 60 percent by weight and the carbon is preferably in the range of 10 to 50 percent by weight.

In yet another embodiment a specularly reflective surface may be imparted to the reflector by the formation of a highly reflective coating. In one embodiment the reflective coating is a hot-stamped metal foil or reflective glass-free polymer-based film having at least one reflective layer coated thereon. In another embodiment the reflective coating is deposited directly onto the surface of the reflector panel itself This may be accomplished by electroplating, electroless plating, plasma spraying, physical vapor deposition, chemical vapor deposition, or spraying from a nozzle. The metals used to form one or more layers which comprise the reflective coating are preferably aluminum, gold, silver, nickel, copper, and chromium. In still another embodiment the reflective coating comprises a dielectric material such as magnesium fluoride, silicon dioxide, tantalum pentoxide, zinc sulfide, or titanium dioxide.

According to one specific embodiment of the invention, the reflective coating comprises a multilayer structure comprising sequentially stacked thin films of nickel, copper, nickel, and chromium. In this embodiment the first nickel layer is about 0.0001 inches thick, the copper layer has a thickness of about 0.0004 to about 0.0007 inches, the second nickel layer has a thickness of about 0.0002 to about 0.0004 inches, and the external chromium layer has a thickness of about 0.0001 to about 0.0002 inches. The nickel/copper/nickel/chromium multilayer structure may further comprise a gold layer formed on the chromium layer. The multilayer structure is preferably formed by a process comprising initially immersing the plastic substrate (i.e., reflector panel) to be coated into a chromic and sulfuric acid bath for 6 minutes followed by immersion in a palladium colloid complex for 2 minutes and a hydrochloric acid complex for an additional 2 minutes. Electroless plating of a Ni layer proceeds for 6 minutes followed by electroplating of copper for 20 minutes, electroplating of nickel for 10 minutes, and then electroplating of chromium for 1 minute. After completion of the process the sample is rinsed in water and blown dry.

Still another embodiment relates to a solar concentrator comprising a plurality of reflector panels arranged in a two-dimensional grid. Individual reflector panels are supported by a support frame assembly. Each reflector panel can be secured to the support frame assembly in a manner which does not distort or affect the reflective front surface. The surface contour formed by the arrangement of reflector panels is configured to a focal point where a receiver may be situated. The support frame assembly is configured to by a plurality of cross-support bars and support bars along with a receiver which is positioned at the focal point of the solar concentrator defined by the surface contour formed by the reflector panel arrangement. According to a specific embodiment of the invention, the front surface contour has a parabolic profile. Additionally, the support frame assembly may be configured to rotate about a first axis and a second axis which is perpendicular to the first axis.

Another embodiment relates to a method of using a plurality of reflector panels to reflect and concentrate radiation to a region where it can be converted to a usable form of energy. This may be accomplished by the use of, for example a heat transfer medium, a photoelectric cell, a thermoelectric module, or a Stirling engine. When the solar concentrator is used to concentrate incident solar radiation onto the receiver, its efficiency can be maximized by tracking the sun's motion across the sky. By mounting the support frame assembly on dual rotable axes, the entire solar concentrator assembly can be rotated to continuously track the sun's motion across the sky and thereby maximize the intensity of solar radiation incident upon the receiver.

DETAILED DESCRIPTION OF THE INVENTION

The above and other objectives of the invention will become more apparent from the following description and illustrative embodiments which are described in detail with reference to the accompanying drawings. Similar elements in each Figure are designated by like reference numbers and, hence, subsequent detailed descriptions thereof may be omitted for brevity.

Figure 5:
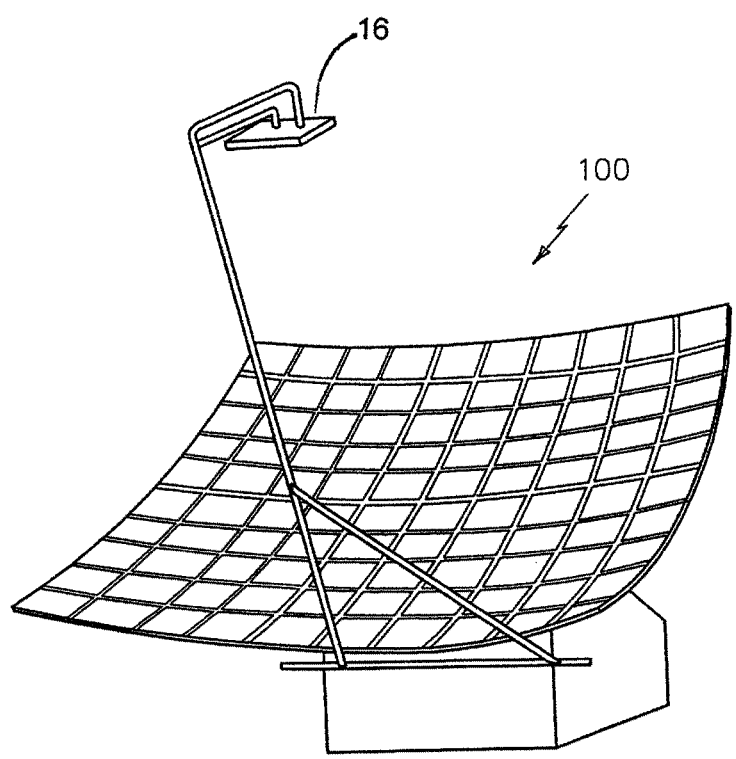
FIG. 5 shows a perspective view of a solar concentrator comprising a plurality of flat reflector panels which are supported and oriented by an underlying support frame assembly to reflect incident solar radiation toward a receiver.

The present invention relates generally to an improved solar concentrator, as presented in FIG. 5 (100). Incident radiation is reflected from a plurality of surfaces and concentrated upon a predetermined region where it is converted into a usable form of energy. As previously indicated, conventional solar concentrators suffer from a number of drawbacks arising primarily from their complexity and cost. The present invention is based on the discovery that many of these issues may be addressed by arranging a plurality of reflective panel front surfaces into a periodic arrangement having an overall shape analogous to a solar dish. Throughout this specification individual reflective front surfaces will be identified and defined as a reflector panel or, more preferably, a front surface solar reflector panel. Each reflector panel has a planar front surface capable of reflecting solar radiation with minimal reflection losses. Since individual reflector panels have a reflective front surface which is substantially flat, complexities associated with the fabrication and support of precisely formed curved surfaces may be avoided.

A plurality of solar reflector panels are arranged into a two dimensional grid or arrangement having a predetermined number of rows and columns by means of a support frame assembly. The planar surface formed by the two-dimensional arrangement or grid may be contoured such that the front surface normal of each solar reflector panel is pointed toward a predetermined region. Radiation incident upon a large area is thereby reflected to and concentrated upon a smaller region. The arrangement therefore operates in a manner analogous to a solar dish, but without many of its complexities. Since each reflector panel is spaced apart from its neighbors, the thus-formed dish provides lower wind resistance and less surface degradation from wind-blown particles. The use of flat reflector panel front surfaces also enables concentration of both direct (directly from the sun) and diffuse (scattered by the atmosphere) solar radiation. Forming a solar concentrator in this manner combines the advantages of flat plate heliostats with those of solar dish concentrators.

It is to be understood that although the solar concentrator disclosed in this specification is described with reference to the reflection and concentration of incident solar radiation, it is to be understood that it is not so limited and its application may extend to the concentration of any source or type of electromagnetic radiation. A description of each individual component as well as the overall construction, assembly, and use of the solar concentrator will now be described in detail. In describing each component, the disadvantages of the prior art and how the present invention addresses these issues will be emphasized.

I. Reflector Panel Synthesis

A mirror is a device designed primarily for specular reflection of incident electromagnetic radiation. Specular reflection occurs when light from a single incoming direction is reflected into a single outgoing direction. More specifically, specular reflection occurs when the angle of incidence (as measured from the surface normal) is equal to the angle of reflection. This is in contrast to diffuse reflection in which incident light is reflected in a broad range of directions. Conventional mirrors are formed by coating one side of a flat glass plate with a thin film of aluminum (Al) which has a reflectivity comparable to that of silver (Ag), but at a fraction of the cost. An example of a glass mirror formed with a Ag back coating is provided by U.S. Pat. No. 4,737,188 to Harry J. Bahls which is incorporated by reference as if fully set forth herein.

Practical mirrors require that the Al film be coated with a protective layer to prevent exposure of the reflective layer to ambient humidity. The protective layer is necessary due to the tendency of Al to be eroded by moisture which would otherwise reduce its reflective qualities. Since a glass plate is generally impenetrable and insusceptible to humidity it is relatively easy to form a sufficiently durable mirror by ensuring the humidity-resistance of the back-coat layer. One issue with this construction is that the glass itself diffuses or absorbs a fraction of the incident radiation, creating double reflections and a reduction in the intensity of light reflected by the mirror. Because of these problems, more advanced technical applications such as lasers typically require mirrors in which the reflective coating is applied to the front surface of the substrate. However, in this case use of a protective layer significantly degrades the reflectivity of the mirror itself Due to the high production costs, weight issues, and fragility of glass mirrors, the development of low-cost, durable plastic mirrors has been heavily researched. Mirrors fabricated with a synthetic resin-based substrate backed by a reflective coating offer the advantages of low fabrication costs, light weight, and resistance to fracture. An example is provided by U.S. Pat. No. 6,601,960 to David A. Richard which discloses a polymer-based mirror formed from a synthetic thermoplastic or thermoset resin substrate which is resistant to warping and distortion due to moisture. Additional examples are provided by U.S. Pat. Nos. 6,409,354; 5,483,386; 4,944,581; 4,385,804; 4,193,668; and 4,666,264, each of which is incorporated by reference as if fully set forth herein. Despite the improvements attained in the prior art, the transmissive qualities of most plastics have not been adequate for use in mirror functions. Various problems with the optical properties of plastics and aberrations which form during molding of these materials contribute to a reduction in the amount of light transmitted through the substrate and reflected by a back reflective coating. As such, there is a need for a reflective element which has the properties of plastic (e.g., lightweight yet durable) combined with a glass-like external reflective surface (e.g., smooth, hard, and scratch-resistant).

Figure 1A:
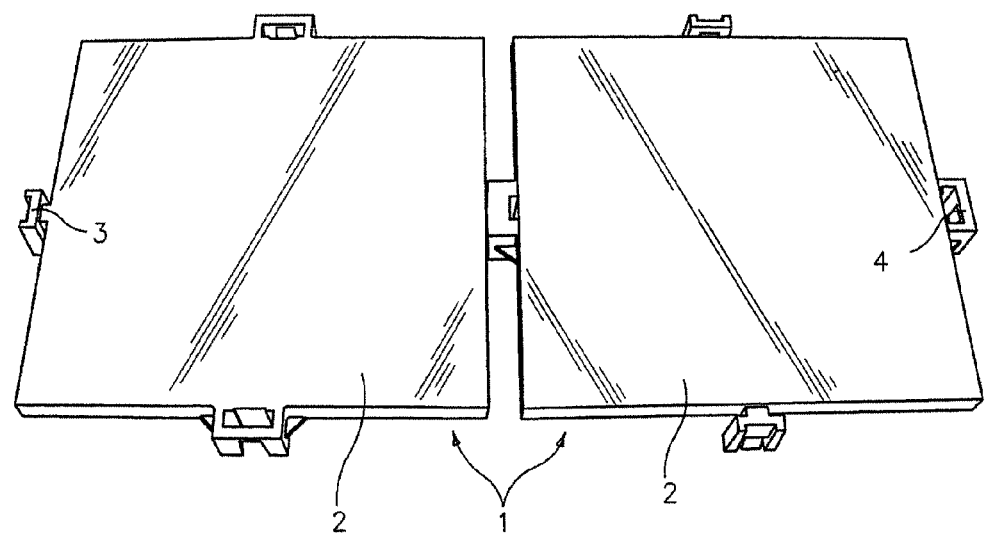
FIG. 1A shows a front view of two solar reflector panels.

The present specification discloses the fabrication and use of individual reflector panels, which are displayed in the Figures herein. The reflector panels (1) are lightweight, durable, and provide sufficient rigidity for purposes disclosed. Examples are presented in FIG. 1A where a front view of two interconnected reflector panels (1) are shown. In FIG. 1A, the reflector panel (1) is substantially planar, having optically flat front surface (2) and square external dimensions. An optically flat surface is defined as a surface whose imperfections are smaller than the wavelength of light which is reflected by the surface. Although the reflector panel (1) is shown to be square, any shape or combination of shapes which facilitates efficient packing within a two-dimensional plane may be used. Examples of alternate shapes which may be used include triangular, rectangular, hexagonal, octagonal, or any other shape which is well-known in the art. Furthermore, the front surface (2) of the reflector panel (1) can be curved or take on any other surface profile as is well-known in the art. When coated with a suitable reflective coating, the front surface (2) of each reflector panel (1) functions as a front surface mirror which can be suitably positioned and aligned to specularly reflect incident radiation to a desired target. The coating process is described in detail in Section II below.

In one embodiment each reflector panel (1) comprises means for interlocking a plurality of reflector panels (1) together to form a two-dimensional planar arrangement. This is illustrated in FIG. 1A as male connector(s) (3) and female connector(s) (4) formed on each side of the square reflector panel (1). Opposing sides of the reflector panel (1) comprise the same type of connector(s) and the connector type alternates between male connector(s) (3) and female (4) connector (s) around the perimeter of each reflector panel (1). This design enables mass-production of a plurality of reflector panel (1) modules using a single design, thereby reducing production costs. Each reflector panel (1) is rotated 90° with respect to its neighboring reflector panel (1), permitting matching of male and female connectors, (3) and (4), respectively, in horizontal and vertical directions. According to an embodiment of the invention as shown in FIG. 1A, the male connector (3) is U-shaped (and/or of slotted square shape) and is capable of "mating" with a matching female connector (4) by sliding in a direction which is perpendicular to the plane of the front surface (2) of reflector panel (1). A locking mechanism which permits the male connector (3) to "snap" into place when fully engaged in the female connector (4) may also be provided. It is to be understood that the male connector (3) and female connector (4) themselves are not limited to those shown and described, but may be any type which permits two opposing articles to be reversibly attached and detached as is well-known in the art.

Figure 1B:
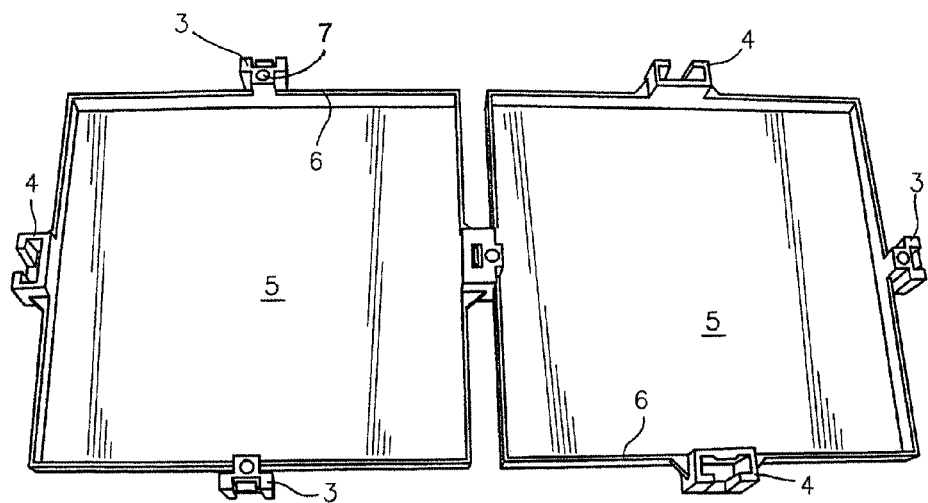
FIG. 1B is a posterior or rear view of the reflector panels illustrated in FIG. 1A.
Figure 1C:
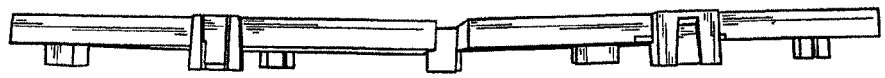
FIG. 1C shows a lateral side view of the reflector panels in FIG. 1A.

A posterior view of the reflector panel (1) in FIG. 1A is provided in FIG. 1B. In FIG. 1B, the assembly as shown has been rotated 180° with respect to the image in FIG. 1A. Additional stability is imparted to the reflector panel (1) and posterior surface (5) by forming a posterior lip (6) along the outer perimeter of each reflector panel (1). The posterior lip (6) extends to a predetermined distance from the posterior surface (5) and preferably forms an angle of about 90° with respect to the plane of the posterior surface (5) of the reflector panel (1). Although internal structural ribs are contemplated within the scope of the invention, they are not preferred because of a possible increase in imperfections caused by the internal structural rib during manufacturing. These structures may adversely affect the front surface (2) and posterior surface (5) profile, and, thus, the reflectivity of the reflector panel's (1) front surface (2). A planar side view of the interconnected reflector panel(s) (1) provides additional details, as provided in FIG. 1C.

Figure 2:
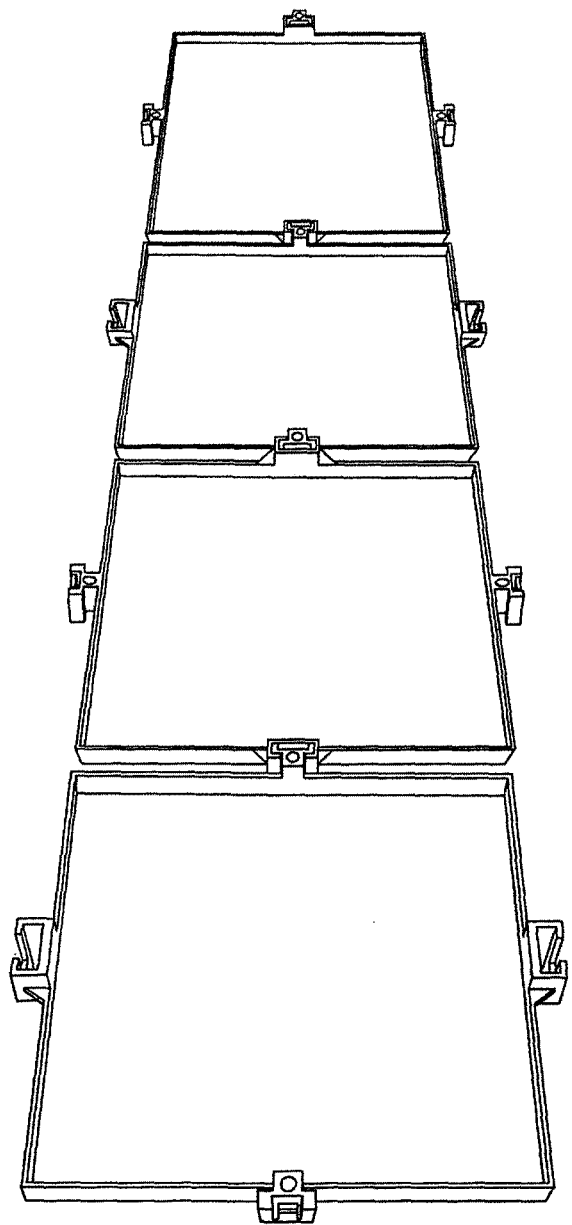
FIG. 2 shows a posterior view of a plurality of reflector panels which are interconnected via male connectors and female connectors in a column.

By arranging a plurality of reflector panels (1) into evenly spaced rows and columns and connecting adjoining reflector panels (1) via their male and female connectors (3) and (4), respectively, a two-dimensional array of reflector panels (1) is formed. An example showing a posterior or rear view of a series of individual reflector panels (1) that are interlocked together to form a single column is displayed in FIG. 2. Each individual reflector panel (1) along the column is rotated 90° with respect to its neighboring reflector panel (1), such that, along each side of the column, the connector type alternates between male connector(s) (3) and female connector(s) (4). Some "taper" or distance between the reflector panels (1) is designed into the interlocking male and female connectors (3) and (4), so as to provide when assembled a collective surface, of the thus-formed arrangement or grid, which can be contoured to the desired angle as may be determined, for example, by a focal point. In another embodiment of the invention, the surface contour formed by the arrangement of reflector panels (1) forms a portion of the surface of a sphere having a predetermined radius. In this arrangement the surface normal at the center of each individual reflector panel (1) is positioned such that it points toward the center of the sphere.

The desired arrangement is formed by means of a support frame assembly (8) as presented in FIG. 4A, which is described in additional detail in Section III herein below. Each reflector panel (1) is also provided with a means for securely attaching to the support frame assembly (8) that comprises several detachable components that are more fully discussed herein below and presented in FIG. 4A. According to one embodiment of the invention, attachment of the reflector panel (1) to the support frame assembly (8) is accomplished by inclusion of integral hole(s) (7) that are provided within each male connector (3), as displayed in FIG. 1B. In this manner, each male connector (3) can be secured to the support frame assembly (8) by means, such as, for example, a self-tapping screw. Alternatively, the integral holes (7) may be threaded such that screws can be directly attached thereto. In an alternative embodiment the reflector panels (1) may be attached to the support frame assembly (8) by means of an adhesive.

Since each reflector panel (1) is formed from a standard template, a large number can be quickly and efficiently mass produced. According to an embodiment of the invention, the reflector panel(s) (1) are formed by injection molding into a mold cavity, which is suitable for the formation of plastic articles that simulate glass surfaces. The mold is preferably a single cavity aluminum mold. The throat of the injection screw is preferably equipped with a pressure sensing and regulating apparatus. The mold is initially closed and injected with the desired synthetic resin. A portion of the mold is thereafter used to pressurize the mold material back into the injection port. Although injection molding is the preferred manufacturing process, any other method which is well-known in the art and is capable of producing the desired finished product may be used. Examples include The reflector panels (1) are preferably formed from a synthetic resin which yields a finished product of excellent hardness, rigidity, and durability. The thus-formed reflector panel(s) (1) will also be lightweight, free of manufacturing defects, and be compatible with the process(es) used to impart reflectivity to the surface. In one embodiment of the invention, the reflector panel (1) is formed from acronitrile-butadiene-styrene (ABS) resins whose preparation is disclosed, for example, in U.S. Pat. Nos. 2,769,804; 2,989,517; 2,739,142; 3,991,136; and 4,387,179, each of which is incorporated by reference as if fully set forth herein. Throughout this application, the use of the term ABS includes all acrylonitrile-butadiene styrene resins as well as compositions and mixtures of such resins with stabilizers, fillers, and other materials. Included among these is ABS resins sold under the trademarks LUSTRAN™ (Mfg. by Monsanto), CYCOLAC™ (Mfg. by Marbon), or KRALASTIC™ (Mfg. by Uniroyal). Reflector panel(s) (1) formed by injection molding ABS are excellent in appearance, mechanical strength, and hardness. Additionally, these reflector panels (1) can tolerate elevated temperatures and have excellent resistance to humidity and salt water.

In alternative embodiments the reflector panel (1) may be formed from a granular plastic material comprising a plastic or synthetic resin and an inorganic additive. The plastic may be selected from polycarbonate, olefin resins, ABS resin, recycled synthetic resin material, and styrol resin. The additive may comprise oxides, hydroxides, carbonates, sulfates, silicates, nitrides, carbons, and potassium titanate. The amount of potassium titanate added is preferably in the range of 20 to 60 percent by weight. The oxides may consist of silica, diatomaceous earth, alumina, magnesium oxide, titanium oxide, zinc oxide, and antimony oxide. The amount of silica, diatomaceous earth, alumina, or magnesium oxide used is preferably in the range of 20 to 60 percent by weight. The amount of titanium oxide, zinc oxide, or antimony oxide is preferably in the range of 25 to 70 percent by weight. The hydroxide may consist of magnesium hydroxide, aluminum hydroxide, or basic magnesium carbonate. The amount of the hydroxide is preferably in the range of 20 to 60 percent by weight. The carbonate may consist of calcium carbonate, magnesium carbonate, or barium carbonate. The amount of calcium carbonate or magnesium carbonate is preferably in the range of 20 to 60 percent by weight whereas the amount of barium carbonate is preferably in the range of 25 to 70 percent by weight. The sulfate may consist of calcium sulfate, calcium sulfite, or barium sulfate. The amount of calcium sulfate or calcium sulfite is preferably in the range of 20 to 60 percent by weight whereas the amount of barium sulfate is preferably in the range of 25 to 70 percent by weight. The silicate may consist of calcium silicate, talc, kaolin clay, mica, zeolite, attapulgite, bentonite, sericite, aluminum silicate, feldspar powder, magnesium silicate or apatite. The amount of silicate is preferably in the range of 20 to 60 percent by weight. The nitride is preferably silicon nitride and the carbon may be either carbon black or graphite. The nitride concentration is preferably in the range of 20 to 60 percent by weight and the carbon is preferably in the range of 10 to 50 percent by weight.

In yet another embodiment, the body of the reflector panel (1) is formed from a lightweight metal such as Aluminum (Al), titanium (Ti), or related alloys. The metal can be stamped, cast, or forged into the desired size and shape. It is to be understood that the type and amount of synthetic resin and other additives used to form the reflector panel (1), support frame assembly (8), and other components of the solar concentrator (100) are not limited to those disclosed and described in this specification, but may also include other equivalent materials that are well-known in the art.

II. Formation of a Reflective Coatings

Figure 3A:
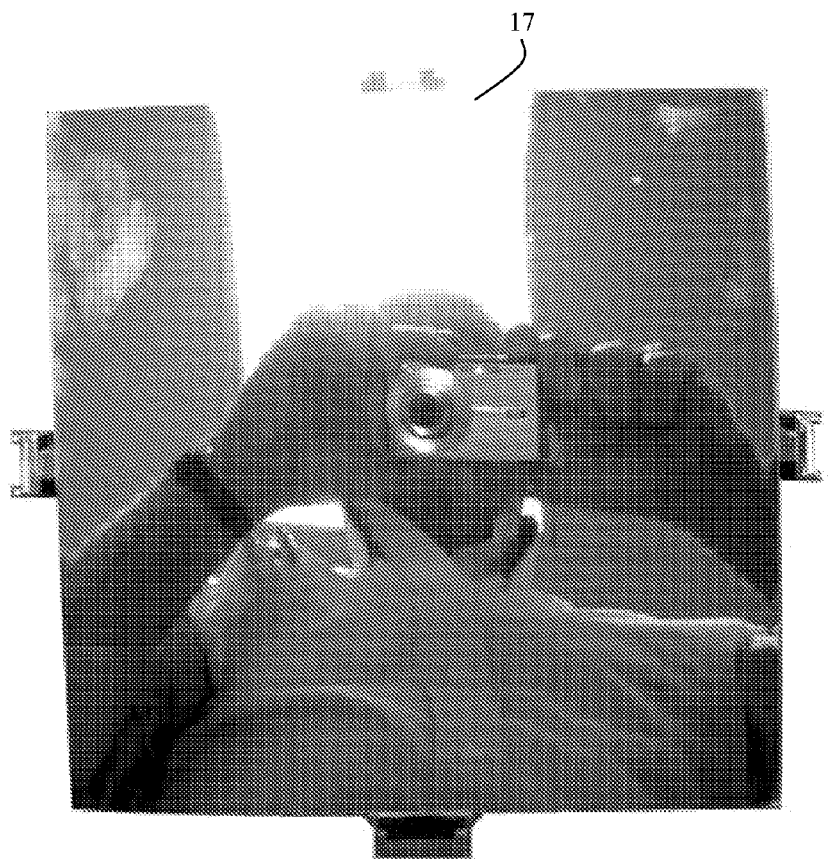
FIG. 3A shows a front surface view of a reflector panel having male and female connectors, which has been coated with a reflective film.
Figure 3B:
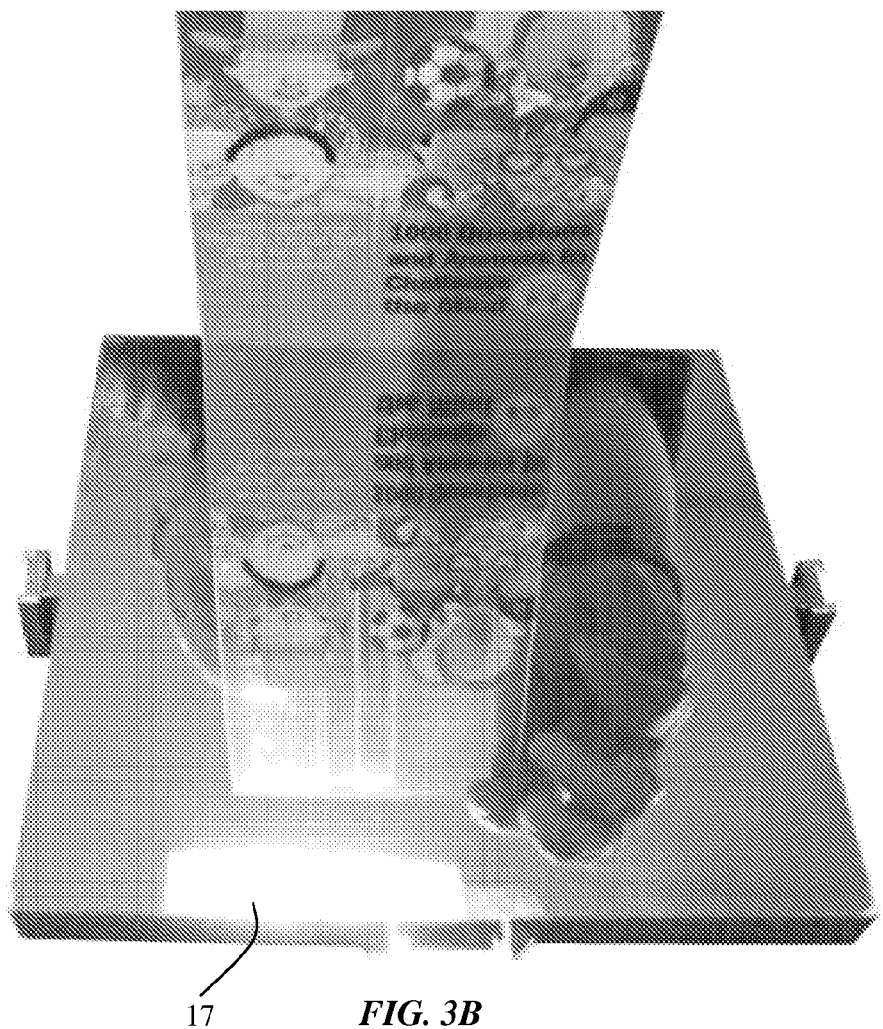
FIG. 3B illustrates the excellent optical quality of the reflective coating of the front surface of a reflector panel.

Specular reflection of the incident radiation by the reflector panel (1) front surface (2) requires the formation of a highly reflective coating (17) thereon and displayed in FIGS. 3A and 3B. In one embodiment a reflective surface coating (17) can be formed by hot-stamping a metal foil or a highly reflective, glass-free polymer-based film. The polymer film may have formed thereon a reflective coating (17) comprising, for example, aluminum (Al), gold (Au), silver (Ag), nickel (Ni), copper (Cu), and chromium (Cr). The reflective coating (17) may be formed on the stamped film or directly on the reflector panel (1) front surface (2) itself using various processes, such as, a thin film growth process, which is well-known in the art. Other processes for installing the reflective coating (17) on the reflector panel (1) front surface (2) include, for example, electroplating, electroless plating, plasma spraying, physical vapor deposition (PVD), chemical vapor deposition (CVD), and spraying from a nozzle. Each of these deposition techniques are well-known and a detailed description thereof will be omitted.

The reflective coating (17) composition, thickness, and number of layers can be tailored to meet the optical properties required for a particular application. If reflection of electromagnetic radiation falling within a certain wavelength range is desired, then a combination of thin films which only reflects light within this range can be used. For example, in some cases it may be desirable to increase or decrease the infrared or ultraviolet reflectance. Applications which require a higher reflectivity or greater durability may use dielectric coatings that are capable of achieving reflectivities as high as 99.999% over a narrow range of wavelengths. Common dielectric materials used for this purpose include, for example, magnesium fluoride, silicon dioxide, tantalum pentoxide, zinc sulfide, and titanium dioxide.

In one embodiment, Cr is used as the reflective coating (17) external surface layer on the front surface (2) of the reflector panel (1), since it forms a hard and durable surface finish exhibiting a bright, silver-like luster. Cr is also resistant to heat, wear, corrosion, erosion, and has a low coefficient of friction. The electroplating of Cr is described, for example, by George Dubpernell in "*Modern Electroplating*", edited by Frederick Lowenheim and published by John Wiley, p. 78 (1974). Electroplating as well as various Cr plating baths are also disclosed by Brassard in "*Decorative Electroplating—A Process in Transition*", Metal Finishing, pp. 105-108, June 1988 as well as in an article by Zaki entitled "*Chromium Plating*", PF Directory, pp. 146-160. Additional disclosures on electroplating processes are provided in U.S. Pat. Nos. 4,460,438; 4,234,396; 4,199,491; and 4,093,522. Each of the aforementioned references are hereby incorporated by reference as if fully set forth herein. In another embodiment, a reflective coating (17) composition having good resistance to corrosion and the deleterious effects of thermal cycling is formed by depositing an initial surface layer of Ni on the front surface (2) of the reflector panel (1), followed by a top layer of Cr. Alternative embodiments include a reflective layer of Al or Ag thin films or a multilayer film comprised of sequentially stacked Cu, Ni, and Cr layers. Examples of reflector panels (1) having reflective coating (17) compositions formed with a final Cr layer are presented in FIGS. 3A-B. The excellent optical quality of the reflective coating (17) on the front surface (2) of the reflector panel (1) is evident from the detail present in the reflected images formed thereon (presented in FIGS. 3A and 3B). In FIG. 3B, lettering in the reflection of the brochure is clearly legible. This is an indication of the specularly reflective coating (17) finish which has been attained.

In yet another embodiment a multi-layer weather-resistant coating can be optionally applied to all non-reflective parts of the reflector panel (1), e.g., the posterior surface (5), posterior lip (6) male and female connectors (3) and (4), and the like, in order to increase the weatherability and durability of the solar concentrator (100). A protective coating may also be applied to prevent oxidation of the reflective coating (17) although such a coating may adversely affect the overall reflectance of the thus-formed mirror. It is to be understood that the reflective coating (17) made from metals, and their associated deposition methods which have been described above are merely exemplary. Different metals or combinations of metals which exhibit a suitable combination of properties, including corrosion resistance and excellent reflectivity can be used.

III. Solar Concentrator

A plurality of reflector panels (1) formed according to Section I and coated with a highly reflective coating (17) of optical quality according to Section II may be assembled to form a solar concentrator (100), as displayed in FIG. 5. The number of reflector panels (1) required to form the solar concentrator (100) depends on the particular application. In the example shown in FIGS. 4A-B, support frame assembly (8), is comprised of a plurality of cross-support bar(s) (9) and support bar(s) (9a), that can support a plurality of reflector panels (1). As presented in FIGS. 4A and 4B the support frame assembly (8) is not fully populated with reflector panels (1), having only six reflector panels (1) fully attached to create two top rows.

Figure 4A:
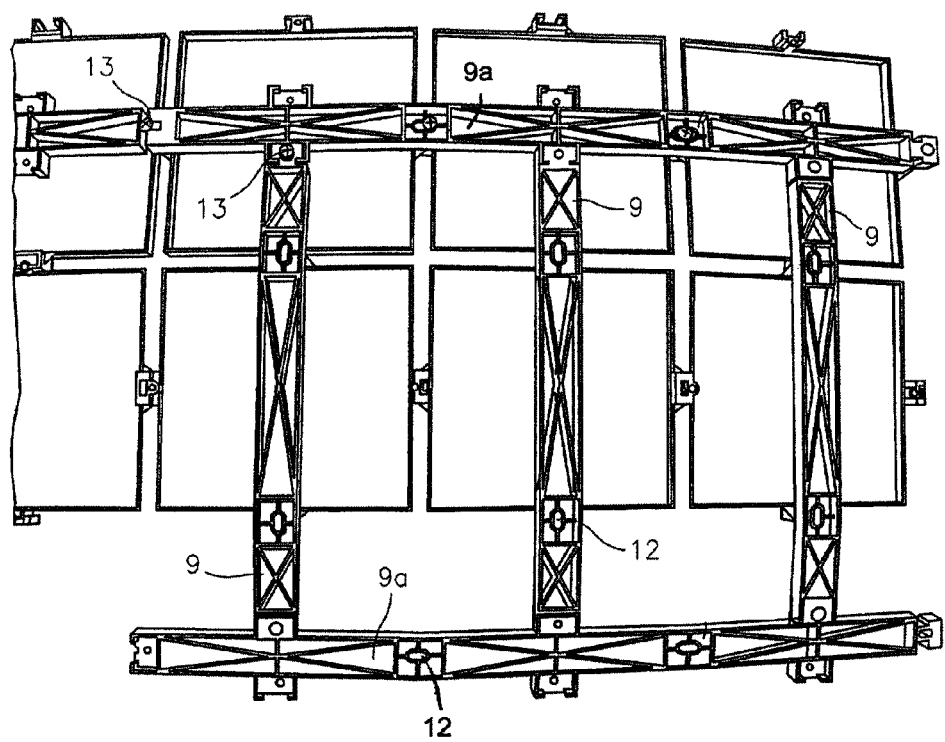
FIG. 4A shows a posterior or rear view of reflector panels which have been interconnected to form a two-dimensional array and are connected to a support frame assembly.
Figure 4B:
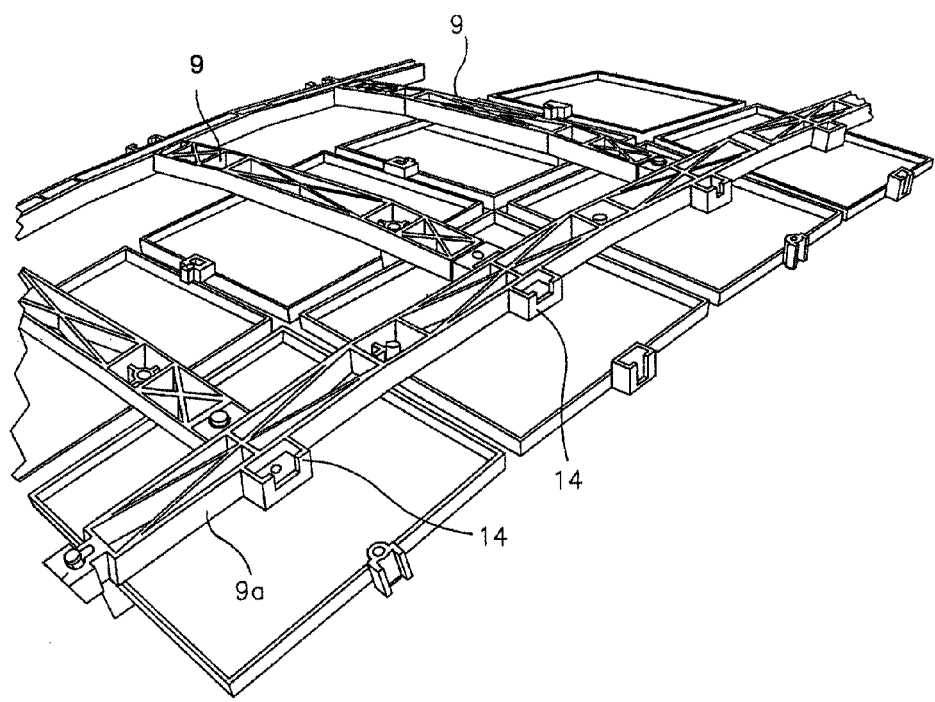
FIG. 4B is a perspective posterior view of interconnected reflector panels in FIG. 3A.

In FIGS. 4A-B, the reflectors panels (1) are connected to each other along their edges by way of the male/female connectors (3) and (4), respectively, to form an evenly spaced arrangement as discussed in Section I above. The spacing between reflectors panels (1) is based on the size of the solar concentrator (100). The support frame assembly (8) provides attachment holes (12) at positions which align with the integral holes (7) on each male connector (3). The reflector panel (1) arrangement is attached to the support frame assembly (8) by means of screws (13) which pass through the attachment holes (12) and secure to the integral holes (10) on each reflector panel (1). Alternative means of attaching reflector panels (1) to the support frame assembly (8) include the use of, for example, tacking rivets, adhesives, or any other means as is well-known in the art which does not damage or distort the front reflective surface.

Each solar concentrator (100) support frame assembly (8) comprises a plurality of cross-support bar(s) (9) and support bar(s) (9a), to form a desired reflector panel (1) arrangement. The support frame assembly (8) is not limited to cross-support bars (9a) and support bars (9) shown and described, but may comprise alternative structures which permits proper attachment of inventive reflector panels (1), as is well-known in the art. The reflector panel (1) arrangement can be made to provide any size reflective surface. As illustrated in FIGS. 4A the cross-support bar(s) (9) and support bar(s) (9a) are attached to each other via screw (13). Note that where cross-support bar (s) (9) and support bar(s) (9a) are connected is also where they are secured to the reflector panels (1). This greatly simplifies the overall design and facilitates ease of assembly. The plurality of cross-support bar(s) (9) and support bar(s) (9a) can be further disposed and aligned on a support frame assembly (8) such that electromagnetic radiation impinging upon each of the plurality of reflector panels (1) is redirected to a receiver disposed at a focal point. The focal point is defined by the overall curvature of the plurality of the support frame assembly (8). This curvature is evident in FIG. 4B since individual reflector panel (1) are not flush with the underlying support frame assembly (8), but rather are shown to bow upwards, off the support frame assembly (8) surface. The degree of curvature imparted to the support frame assembly (8) is set to a predetermined value which depends primarily on the overall size of the solar concentrator (100). In general, the bend angle is very slight, being approximately 1.5° for a 10 foot by 10 foot reflector panel (1) arrangement. For a 12 foot by 12 foot reflector panel (1) arrangement the angle would decrease to 0.75°. This angle is identical in both the horizontal and vertical directions. The angle can be calculated based on the desired focal point to maximize efficiency or be tailored to a particular application. The angle itself is defined when designing the support frame assembly (8) can then be manufactured to the desired specifications. According to another embodiment of the invention, the bend angle is defined based on the radius of a sphere. In this case the surface curvature formed by the plurality of reflector panels (1) is such that the surface normal at the center of each individual reflector panel (1) points toward the center of the sphere.

According to one specific embodiment of the invention, the support frame assembly (8) is formed from cross-support bar(s) (9) and support bar(s) (9a) components. This can be seen from FIG. 4B, where a plurality of cross-support bar(s) (9) and support bar(s) (9a) are assembled to form the reflector panel (1) arrangement. The cross-support bar(s) (9) is a "t-bar" which is identified by components (9). The support bar(s) (9) is an elongated horizontal bar having vertical members (14) situated at positions that coincide with the center of each individual reflector panel (1). The reflector panels (1) are attached to the cross-support bar(s) (9) and support bar(s) (9) via screws (13) at positions midway between each vertical member (14) component. Each vertical member (14) component mates with a corresponding cross-support bar (9) which may be individually secured by means of screws (13) which pass through holes (14). The opposing end of each cross-support bar (9) is similarly attached to a support bar (9a). By assembling a plurality of cross-support bar (s) (9) and support bar(s) (9a) having a predetermined curvature, a reflective panel (1) arrangement having the desired overall size and focal length may be formed.

Each component forming the support frame assembly (8) is preferably fabricated from a low-cost and light-weight material which is easily mass-produced. In one embodiment the support frame assembly (8) components, i.e., cross-support bar(s) (9) and support bar(s) (9a) members, are injection molded with a glass-reinforced UV-stabilized resin. In another embodiment the support frame assembly (8) components are made from a lightweight metal or metal alloy that is extruded, forged, or cast into the desired shape. Each component is preferably of suitable length for ease of shipment, assembly and scalability to form arrays of different sizes.

When the desired support frame assembly (8), with the corresponding reflector panel (1) arrangement, is formed the entire support frame assembly (8) may be secured, optionally, to an external support frame (not shown) that is capable of supporting the entire support frame assembly (8). An example of a fully assembled solar concentrator (100) is provide in FIG. 5. In this embodiment a 10×10 reflector panel (1) arrangement is used although the total number of reflector panels (1) may be arbitrarily set. The total number of reflector panels (1) used preferably ranges from 9 (3×3 arrangement of reflector panels (1)) to 225 (15×15 arrangement of reflector panels (1)), but is not so limited.

Figure 6A:
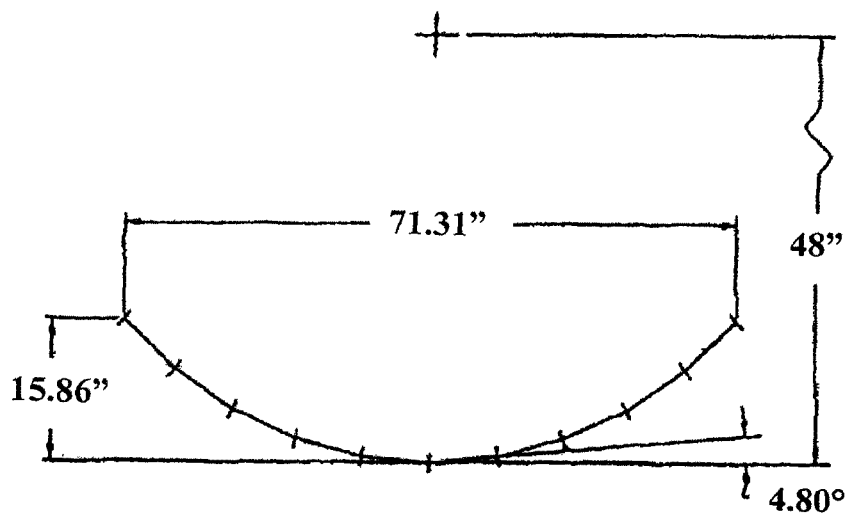
FIG. 6A is a cross-sectional schematic showing the dimensions and degree of curvature for a solar concentrator having a receiver positioned 48 inches away from the center of the dish.
Figure 6B:
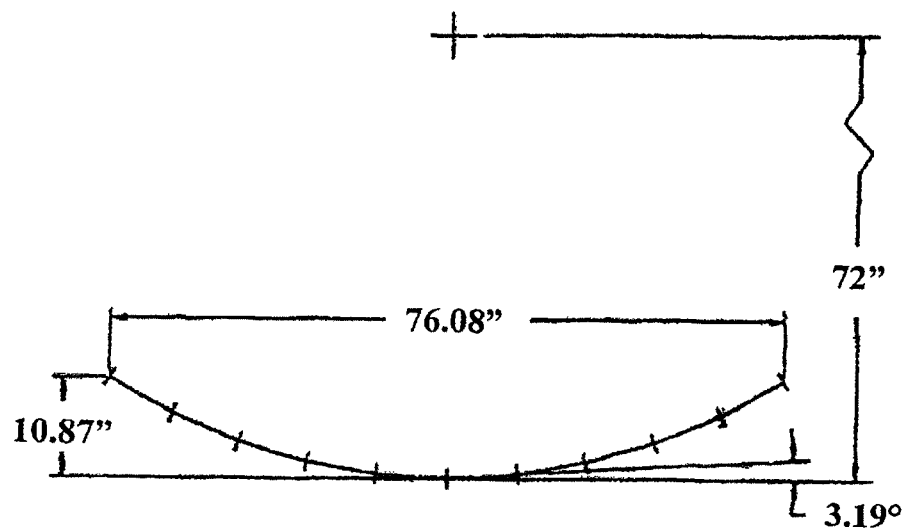
FIG. 6B is a cross-sectional schematic showing the dimensions and degree of curvature for a solar concentrator having a receiver positioned 72 inches away from the center of the dish.
Figure 6C:
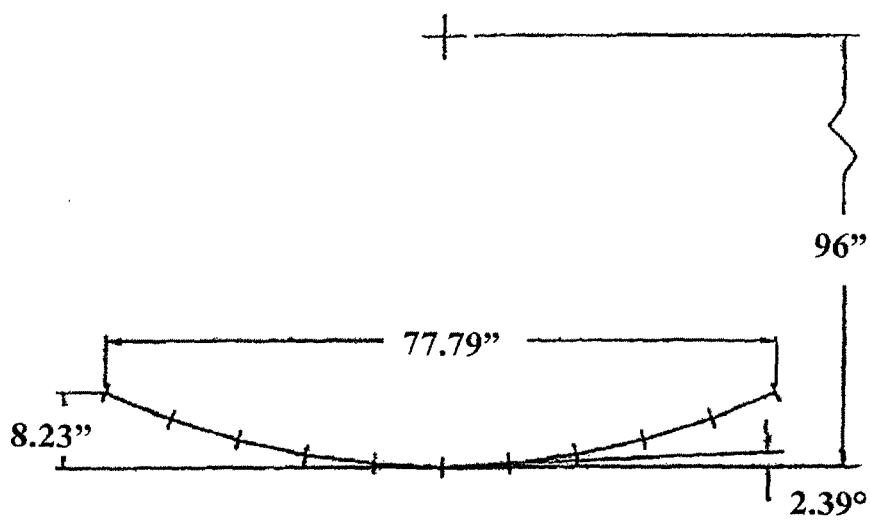
FIG. 6C is a cross-sectional schematic showing the dimensions and degree of curvature for a solar concentrator having a receiver positioned 96 inches away from the center of the dish.
Figure 6D:
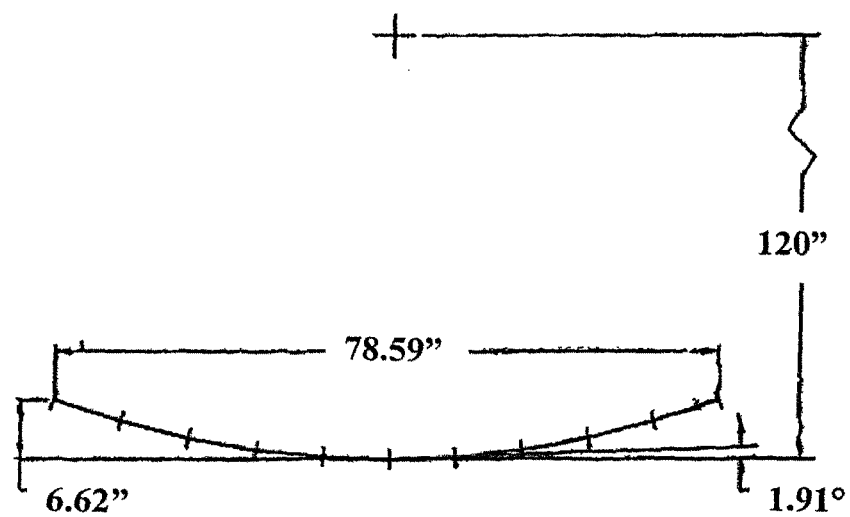
FIG. 6D is a cross-sectional schematic showing the dimensions and degree of curvature for a solar concentrator having a receiver positioned 120 inches away from the center of the dish.

The dimensions and degree of curvature for solar concentrators constructed from a 10×10 arrangement of reflector panels (1) are shown in FIGS. 6A, 6B, 6C, and 6D for solar concentrator (100) having a receiver positioned at a distance of 48, 72, 96, and 120 inches, respectively, from the center of the solar concentrator dish. FIGS. 6A-D show that a shorter dish-to-receiver distance requires a greater dish curvature in order for incident light to be reflected to the targeted region. For a 48 inch dish-to-receiver distance as shown in FIG. 6A, the outer edges of the dish are bent inwards by 15.86 inches from the back central plane whereas the distance between ends is 71.31 inches. The bend angle for each reflector panel in FIG. 6A is 4.80 degrees. Similarly, for the 72 inch dish-to-receiver distance in FIG. 6B the outer edges are bent inwards by 10.87 inches, the length is 76.08 inches, and the bend angle is 3.19 degrees. For a 96 and 120 inch dish-to-receiver distance in FIGS. 6C and 6D, respectively, the outer edges are bent inwards by 8.23 and 6.62 inches, the length is 77.79 and 78.59 inches, and the bend angles are 2.39 and 1.91 degrees, respectively. It is to be understood that FIGS. 6A-D are merely provided to illustrate possible solar concentrator dish configurations and are not intended to be limiting.

When light is reflected from a planar front surface (2) of the reflector panel (1), reflection losses are a minimum for light reflected along the normal to the planar front surface (2). As the angle of incidence (as measured from the front surface (2) normal) increases, reflection losses increase due to polarization of the incident light. The larger the angle of incidence, the larger the amount lost in reflectance. This may be demonstrated by, for example, reflecting light off of a surface at a variety of angles and using a thermocouple to measure the temperature at each angle. The smaller the reflection angle, the higher the temperature reading will be. Thus, a smaller angle of incidence will reflect incident light more efficiently. As an example, by using ABS coated with layers of Cu, Ni, and Cr, a flat plate reflector has a polarization loss of only 33% at an angle of 25° from the surface normal. By comparison, a standard flat plate glass mirror with a silver backing has a polarization loss of 66 percent under identical conditions. The flat panel reflectors disclosed and described herein therefore have the advantage of being able to reflect a larger percentage of the incident solar radiation as compared to conventional glass mirrors.

Sunlight impinging upon each reflector panel (1) is reflected to a receiver (16) which is disposed above the center of the plurality of reflector panels (1). Each individual reflector panel (1) may be aligned to reflect incident radiation directly towards the receiver (16). Under normal atmospheric conditions, solar radiation incident on the Earth's surface is scattered by water vapor, clouds, and other particulates. This produces diffuse as opposed to direct solar radiation. The diffuse component may represent as much as 25-30 percent of the total solar radiation depending upon local weather conditions. On a cloudy day, incident solar radiation is virtually 100 percent diffuse solar radiation. Most concentrating solar collectors are only able to concentrate the parallel insolation arriving directly from the sun's disk using paraboloidal reflectors and must track the sun's path across the sky. Flat plate solar concentrators (100) such as the one shown in FIG. 5 and disclosed herein have the advantage of being able to reflect both diffuse and direct solar radiation. Although it is not required, the solar concentrator (100) shown in FIG. 5 may be equipped with a mechanism which permits rotation about a first and second axis such that the solar concentrator (100) can follow the path and angle of the sun as it moves across the sky, thereby increasing its overall collection efficiency. The tracking mechanism is not limited to any particular type, but may be a servo motor tracking unit or any other system which is well-known in the art.

The receiver (16) may be any mechanism which is capable of converting concentrated radiation into a more useful form of energy. In one embodiment of the invention, the receiver (16) is fabricated from Cu, a highly light-absorbing coated metal, or tempered glass which has a liquid circulated therethrough. Circulating fluids such as air, water, salt eutectics, or oils can be pumped through the receiver. The concentrated solar radiation heats the circulated liquid, thereby providing heat energy, steam, or hot water for hot water systems or various devices such as cookers which require thermal energy. When water is used as a circulating fluid, the generated steam can be used to turn a steam turbine which generates electricity. In another embodiment of the invention, photoelectric cells may be provided within the receiver to convert the concentrated sunlight directly into electricity. The photoelectric cells may be cooled using Freon or other expansion refrigerants as is well-known in the art. This fluid can also be used for other cooling purposes such as air conditioning in homes and buildings. Alternatively the cooling fluid can be used as a heat transfer medium to generate process heat as described above. In yet another embodiment the receiver may be populated with thermoelectric modules (TEM) which are exposed to direct heat on the front side while the back side is cooled with the appropriate coolant. The thus-produced temperature difference can be used to generate electricity. As in previous embodiments, the cooling fluid used with the TEM can be used as a heat transfer medium. In still another embodiment a Sterling engine or Rankine cycle technology which converts heat to mechanical energy can be used.

In yet another embodiment of the invention, the heated mediums described above can be applied to various chemical, industrial, and room conditioning processes. These include, for example, desalination, distillation, and any other application which requires heating and/or cooling. The heated medium may be utilized for the conversion of liquefied natural gas to pipeline-quality gas. The standard process for this conversion typically requires large quantities of low-grade thermal energy. In still another embodiment, the focal point area can be used as an incineration point in which products to be incinerated are fed directly to the focal point area. Some examples include, but are not limited to the destruction of hazardous wastes and traditional landfill material such as paper, plastics, and wood. This can also be adapted for gasification, pyrolysis and thermal treatment of wastes to generate desired products such as synthetic gas, pyrolysis oils, and biochar. Under the appropriate conditions, sufficient heat energy may be generated to dissociate molecules. This may be accomplished by use of insulation products and a finely focused solar concentrator.

It is to be understood that the applications described above are merely exemplary of many possible uses of the present invention. The examples provided above are not meant to be limiting, but are intended to be illustrative. Any application which is capable of benefitting from the concentration of incident electromagnetic radiation to a small region may be used.

IV. Exemplary Embodiments

An embodiment describing the fabrication and assembly of a solar concentrator (100) will now be described in detail. It is to be understood that this embodiment is merely exemplary and is used to describe the best mode of practicing the invention. It is also to be understood that there are many possible variations which do not deviate from the spirit and scope of the present invention.

In a specific embodiment of the invention, individual reflector panels (1) are fabricated from ABS-based synthetic resins. ABS was chosen since it yields a cost-efficient flat reflector panel (1) suitable for electroplating (i.e., reflective coating (17)) with structural properties sufficient to permit assembly with other reflector panels (1) to form a desired arrangement. Each reflector panel (1) has interlocking features, i.e., male connector (3) and female connector (4), as described in Section I, supra, which permit easy assembly into an arrangement having the general angular geometry required to focus light to a distance of approximately 8 feet from the center of the reflector panel (1) front surface (2). Reflector panels (1) were designed as 7.5 inch square panels with an optically flat front surface (2) as shown, for example, by reflector panel (1) in FIG. 1A. The reflector panel (1) thicknesses required to provide the best unperturbed plating on front surface (2) yet still provide good structural characteristics were determined to be 0.100 inches along with a 0.075 inch thick by a 0.500 inch high posterior lip (6). No internal structural ribs were considered because any molding sinks or imperfections on the front surface (2) would adversely affect the reflectivity of the plated surface.

The interlocking system (i.e., male and female connectors (3) and (4), respectively) was designed such that at least 0.5 inch gap is provided between each reflector panel (1) in order to minimize the wind resistance of the overall arrangement once assembled. The interlocks were designed along the reflector panel (1) centerlines and incorporate a male connectors (3) and female connectors (4) design with a snap-together feature. The necessary tapers were designed into the interlocks such that once assembled, the reflector panels (1) can follow the required arrangement angle of curvature which is defined by the support frame assembly (8) to which they are attached.

The reflector panels (1) were formed by injection molding into a single aluminum mold cavity. The mold is closed and injected with an ABS resin material while the pressure is continuously regulated and maintained at the desired level. After filling the mold cavity, a portion of the mold is used to pressurize the mold material back into the injection port.

A reflective coating (17) comprising sequentially deposited Ni/Cu/Ni/Cr layers is formed on the ABS reflector panel (1) using a series of surface cleaning and plating processes. Initially the surface is prepared by immersing the reflector panel (1) in a chromic and sulfuric acid bath for 6 minutes. This etches the surface slightly to promote adhesion of the deposited layers. The reflector panel (1) front surface (2) is then activated by immersion in a palladium (Pd) colloid complex for two minutes followed by immersion in a hydrochloric acid complex for an additional two minutes. An initial conductive layer of Ni is deposited by electroless plating. The reflector panel (1) is immersed in a plating bath for 6 minutes to form a 0.0001-inch-thick Ni coating. This is followed by Cu electroplating in a Cu bath for 20 minutes to deposit a 0.0004 to 0.0007 inch thick Cu film. Another Ni film is electroplated onto the Cu by immersion into a Ni bath for 10 minutes to form a 0.0002 to 0.0004 inch thick Ni layer. The final front surface (2) of the reflector panel (1) is coated with a 0.0001 to 0.0002 inch thick film of Cr by electroplating in a Cr bath for one minute. The coated reflector panel (1) is then rinsed in water to remove excess residue and blown dry. An example of a reflector panel (1) coated using the process described, herein above, is shown in FIGS. 3A-B.

Although the manufacturing process described above is for a single reflector panel (1), the processes used are suitable for mass production of a large number of identical reflectors panels (1). The desired number of reflector panels (1) may then be assembled into a two-dimensional arrangement and secured to a support frame assembly (8) and accompanying external frame assembly to form a solar concentrator (100) as described in Section III above. In another embodiment of the invention a thin film of Au was deposited onto the electroplated Ni/Cu/Ni/Cr multilayer stack by sputter deposition. A nine reflector panel (1) (i.e., 3×3) on a support frame assembly (8) comprised of Au-coated reflector panels (1) produced a temperature of 350° F. at a focal length of 4 feet. In yet another embodiment, instead of forming a reflective coating by electroplating, cut squares of a highly reflective, glass-free polymer-based film were applied to the front surface (2) area of each reflector panel (1). A 3×3 reflector panel (1) and support frame assembly (8) comprised of the reflector panels (1) yielded a temperature of 300° F. at a focal length of 4 feet.

It will be appreciated by persons skilled in the art that the present invention is not limited to what has been particularly shown and described hereinabove. Rather, the scope of the present invention is defined by the claims which follow. It should further be understood that the above description is only representative of illustrative examples of embodiments. For the reader's convenience, the above description has focused on a representative sample of possible embodiments, a sample that teaches the principles of the present invention. Other embodiments may result from a different combination of portions of different embodiments.

The description has not attempted to exhaustively enumerate all possible variations. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent. Furthermore, all references, publications, U.S. Patents, and U.S. Patent Publications cited throughout this specification are hereby incorporated by reference as if fully set forth in this specification.

What is claimed is:

1. A solar concentrator comprising a support frame assembly, a receiver, and at least one reflector panel mounted on the support frame assembly having a front surface that is optically flat, wherein said reflector panel is comprised of a synthetic resin and a specularly reflective coating consisting essentially of a first nickel layer, a copper layer, a second nickel layer, and a chromium layer in that order and formed on said synthetic resin and functions as a first surface plane mirror to provide specular reflection of incident electromagnetic radiation, wherein the first surface plane mirror is constructed and positioned so that the electromagnetic radiation's contact with the solar concentrator occurs unimpeded at the first surface plane mirror.

2. The solar concentrator according to claim 1, wherein a front surface contour defined by an arrangement of a plurality of reflector panels has a parabolic profile.

3. The solar concentrator according to claim 1, wherein a front surface contour defined by an arrangement of a plurality of reflector panels has a semi-spherical profile.

4. The solar concentrator of claim 1, wherein the support frame assembly comprises at least one support bar and at least one cross-support bar, said support bar having at least one vertical member for attachment to said cross-support bar.

5. The solar concentrator of claim 1, wherein the reflector panel comprises a posterior surface and a posterior lip around the perimeter of said reflector panel.

6. The solar concentrator according to claim 1, wherein the support frame is configured to rotate about a first axis and a second axis which is perpendicular to the first axis.

7. The solar concentrator according to claim 1, wherein the first surface plane mirror provides specular reflection of incident electromagnetic radiation concentrated on the receiver which is configured to convert concentrated solar/electromagnetic radiation into an alternate form of energy.

8. The solar concentrator according to claim 1, wherein the receiver comprises a heat transfer medium containing object such as a radiator, a photoelectric cell, a thermoelectric module, or a Stirling engine.

9. The solar concentrator according to claim 1, wherein the sides defining the front surface of the reflector panel form the shape of a square.

10. The solar concentrator according to claim 1, wherein the sides defining the front surface form a shape selected from the group consisting of a circle, triangle, a rectangle, a hexagon, and an octagon.

11. The solar concentrator according to claim 1, wherein said at least one reflector panel comprises at least one connector for attachment to said support frame assembly and at least one other reflector panel.

12. The solar concentrator according to claim 11 wherein said connector is at least one male connector and at least one a female connector.

13. The solar concentrator of claim 11, wherein said connectors facilitate attachment of an adjoining reflector panel to form a two-dimensional arrangement.

14. The solar concentrator of claim 11, wherein said connectors provide a taper between adjoining reflector panels in the solar concentrator having at least two reflector panels.

15. The solar concentrator according to claim 1, wherein the specularly reflective coating further consists essentially of magnesium fluoride, silicon dioxide, tantalum pentoxide, zinc sulfide, or titanium oxide.

16. The solar concentrator claim 1, wherein the reflector panel is comprised of a recycled synthetic resin material.

17. The solar concentrator according to claim 1, wherein the reflector panel is comprised of a granular plastic material comprising a plastic and an inorganic additive.

18. The solar concentrator according to claim 17, wherein the plastic is selected from the group consisting of polycarbonate, olefinic resins, acronitrile-butadiene-styrene (ABS) resin, and styrol resin.

19. The solar concentrator according to claim 17, wherein the additive is selected from the group consisting of oxides, hydroxides, carbonates, sulfates, silicates, nitrides, carbons and potassium titanate.

20. The solar concentrator according to claim 19, wherein an amount of potassium titanate is in the range of 20 to 60 percent by weight.

21. The solar concentrator according to claim 19, wherein the oxide is selected from the group consisting of silicas, diatomaceous earth, alumina, magnesium oxide, titanium oxide, zinc oxide and antimony oxide.

22. The solar concentrator according to claim 1, wherein the specularly reflective coating is a hot stamp foil.

23. The solar concentrator according to claim 1 wherein the specularly reflective coating further consists essentially of one or more metals selected from the group consisting of aluminum, gold, nickel, copper, and chromium.

24. The solar concentrator according to claim 1, wherein the first nickel layer has a thickness of about 0.0001 inches, the copper layer has a thickness of about 0.0004 to about 0.0007 inches, the second nickel layer has a thickness of about 0.0002 to about 0.0004 inches, and the external chromium layer has a thickness of about 0.0001 to about 0.0002 inches.

25. The solar concentrator according to claim 1, wherein the specularly reflective coating further consists essentially of an external gold layer.

26. The solar concentrator of claim 1, wherein the specular reflection of incident electromagnetic radiation occurs when electromagnetic radiation from a single incoming direction is reflected into a single outgoing direction.

27. The solar concentrator of claim 1, wherein specular reflection of incident electromagnetic radiation occurs when the angle of incidence of electromagnetic radiation is equal to the angle of reflection.

28. The solar concentrator of claim 27, wherein the angle of incidence is measured from the surface normal.

29. The solar concentrator of claim 1, wherein first surface plane mirror has a polarization loss of about 33 percent at an angle of 25 degrees from the surface normal.

30. The solar concentrator of claim 1, wherein the overall size of the at least one reflective panel provides a corresponding focal area size and shape.

31. The solar concentrator of claim 1, wherein a plurality of reflector panels having an overall size and focal length that is formed to reflect and concentrate radiation to a region.

32. A reflector panel comprising: a substrate having a front surface which is optically flat, wherein the substrate is comprised of a synthetic resin and a specularly reflective coating consisting essentially of a first nickel layer, a copper layer, a second nickel layer, and a chromium layer in that order and formed on the synthetic resin that functions as a first surface plane mirror and provides specular reflection of incident electromagnetic radiation, wherein the first surface plane mirror is constructed and positioned so that the electromagnetic radiation's contact with the reflector panel occurs unimpeded at the first surface plane mirror.

33. A solar concentrator comprising: a plurality of reflector panels, each of which comprises: a substrate having a front surface which is optically flat, wherein the substrate is comprised of a synthetic resin and a specularly reflective coating consisting essentially of a first nickel layer, a copper layer, a second nickel layer, and a chromium layer in that order and is formed on the synthetic resin and functions as a first surface plane mirror to provide specular reflection of incident electromagnetic radiation, wherein the first surface plane mirror is constructed and positioned so that the electromagnetic radiation's contact with the solar concentrator occurs unimpeded at the first surface plane mirror; and, a support frame assembly configured to hold each of the plurality of reflector panels at positions which facilitate reflection of incident electromagnetic radiation to a receiver.

* * * * *